(12) United States Patent
Fey et al.

(10) Patent No.: US 10,745,026 B2
(45) Date of Patent: Aug. 18, 2020

(54) CONTROL DEVICE AND METHOD FOR A DRIVER ASSISTANCE SYSTEM OF A VEHICLE

(71) Applicant: Conti Temic microelectronic GmbH, Nuremberg (DE)

(72) Inventors: Wolfgang Fey, Bodolz (DE); Lutz Kuehnke, Frankfurt am Main (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 0 days.

(21) Appl. No.: 15/780,345

(22) PCT Filed: Nov. 25, 2016

(86) PCT No.: PCT/DE2016/200545
§ 371 (c)(1),
(2) Date: May 31, 2018

(87) PCT Pub. No.: WO2017/092750
PCT Pub. Date: Jun. 8, 2017

(65) Prior Publication Data
US 2018/0345990 A1    Dec. 6, 2018

(30) Foreign Application Priority Data

Dec. 2, 2015   (DE) .................. 10 2015 015 437

(51) Int. Cl.
*B60W 50/14* (2020.01)
*B60R 1/00* (2006.01)
*B60W 40/04* (2006.01)

(52) U.S. Cl.
CPC ............... *B60W 50/14* (2013.01); *B60R 1/00* (2013.01); *B60W 40/04* (2013.01);
(Continued)

(58) Field of Classification Search
CPC combination set(s) only.
See application file for complete search history.

(56) References Cited

U.S. PATENT DOCUMENTS

| 6,856,874 B2 | 2/2005 | Weilkes et al. |
| 2008/0122597 A1* | 5/2008 | Englander ................ B60Q 1/24 340/433 |

(Continued)

FOREIGN PATENT DOCUMENTS

| DE | 198 25 817 | 9/1999 |
| DE | 103 45 013 | 4/2005 |

(Continued)

OTHER PUBLICATIONS

International Search Report of the International Searching Authority for International Application PCT/DE2016/200545, dated Feb. 14, 2017, 3 pages, European Patent Office, HV Rijswijk, Netherlands.

(Continued)

*Primary Examiner* — Nabil H Syed
*Assistant Examiner* — Cal J Eustaquio
(74) *Attorney, Agent, or Firm* — W. F. Fasse

(57) ABSTRACT

A control device and an operating method for a driver assistance system of a vehicle are configured to selectively process image data from only a first vehicle camera or from only a second vehicle camera at any given time, depending on a current operating state of the vehicle, in order for driver assistance functions to be implemented.

20 Claims, 1 Drawing Sheet

(52) U.S. Cl.
CPC ..... *B60R 2300/605* (2013.01); *B60R 2300/70* (2013.01); *B60W 2050/146* (2013.01)

(56) References Cited

U.S. PATENT DOCUMENTS

| | | | |
|---|---|---|---|
| 2010/0134325 A1* | 6/2010 | Gomi | B60R 1/00 340/995.14 |
| 2010/0289631 A1* | 11/2010 | Rao | B60R 1/00 340/435 |
| 2010/0315215 A1* | 12/2010 | Yuda | H04N 5/2259 340/435 |
| 2014/0354816 A1 | 12/2014 | Inanobe et al. | |
| 2017/0158131 A1 | 6/2017 | Friebe | |

FOREIGN PATENT DOCUMENTS

| | | |
|---|---|---|
| DE | 102004023128 | 12/2005 |
| DE | 102005055809 | 5/2007 |
| DE | 102009041588 | 3/2011 |
| DE | 102010051205 | 5/2012 |
| DE | 112013000873 | 10/2014 |
| DE | 102014208663 | 11/2015 |
| JP | 2004-216984 A | 8/2004 |
| JP | 2006-005451 A | 1/2006 |
| JP | 2007-022176 A | 2/2007 |
| WO | WO 2002/084329 | 10/2002 |
| WO | WO 2008/087092 | 7/2008 |
| WO | WO 2016/071412 | 5/2016 |

OTHER PUBLICATIONS

PCT International Preliminary Report on Patentability including English Translation of PCT Written Opinion of the International Searching Authority for International Application PCT/DE2016/200545, dated Jun. 5, 2018, 7 pages, International Bureau of WIPO, Geneva, Switzerland.

German Search Report for German Patent Application No. 10 2015 015 437.0, dated Oct. 26, 2016, 9 pages, German Patent and Trademark Office, Muenchen, Germany, with English translation, 6 pages.

European Office Action in European Patent Application No. 16 816 577.7, dated Mar. 28, 2019, 5 pages, with partial English translation, 2 pages.

Partial English translation of Japanese Office Action in Japanese Patent Application No. 2018-527907, dated May 20, 2020, 3 pages.

* cited by examiner

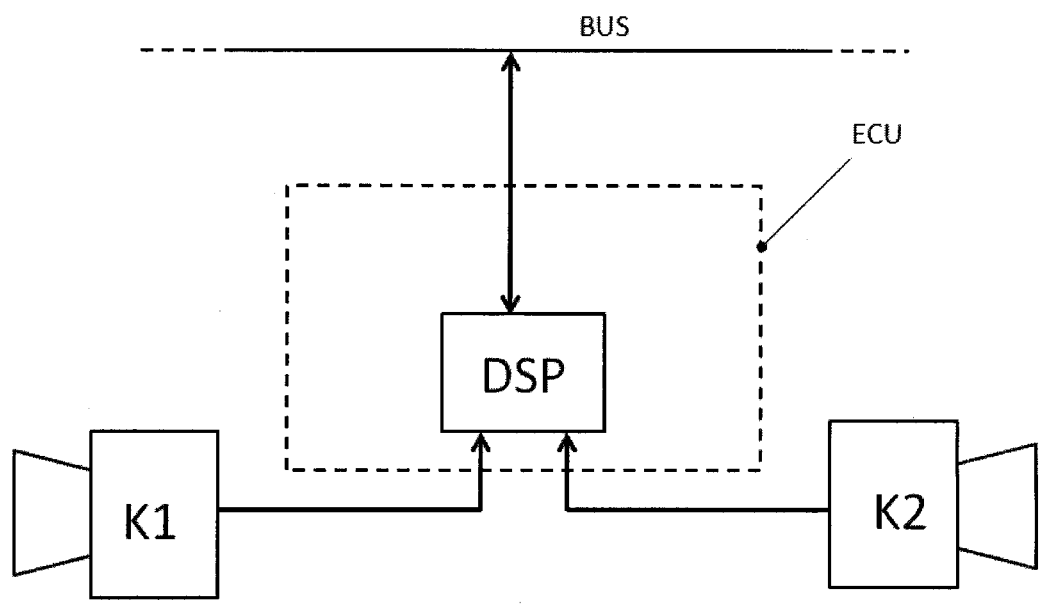

CONTROL DEVICE AND METHOD FOR A DRIVER ASSISTANCE SYSTEM OF A VEHICLE

FIELD OF THE INVENTION

The invention relates to a control device as well as an operating method for a driver assistance system of a vehicle, in which image data of a plurality of vehicle cameras, in particular image data of a first vehicle camera and of a second vehicle camera, are processed in order for driver assistance functions to be implemented.

BACKGROUND INFORMATION

Driver assistance systems for vehicles are fundamentally known from the prior art. In particular, systems are known in which image data from the vehicle surroundings are detected by means of one or more vehicle cameras arranged on the vehicle, the detected image data are processed by means of a control device and different driver assistance functions are implemented as a function of the image processing.

The process of detecting image data from the vehicle surroundings lying in front of the vehicle by means of a front camera, i.e. a vehicle camera preferably arranged in the vehicle interior behind the windscreen and oriented in the direction of the surroundings in front of the vehicle, of processing the image data and of implementing driver assistance functions such as, by way of example, lane assist, traffic sign recognition, lighting control and object or respectively obstacle detection, is known by way of example.

Likewise, the process of detecting image data from the rear area behind the vehicle by means of a reversing camera, i.e. a vehicle camera arranged, by way of example, on the rear of a vehicle, of processing the image data and of implementing driver assistance functions in order to support the vehicle operator during reversing, by way of example displaying the rear vehicle surroundings, the vehicle trajectory as a function of the steering angle or the distance from obstacles, is known.

It is known that so-called signal processors, in particular so-called digital signal processors (DSP), are used for the image processing and programming codes required to implement or respectively execute the driver assistance functions. The image data detected by a vehicle camera can, in this case, be processed with the digital signal processor, using suitable programming codes which are stored—together with the signal processor as well as further components—by way of example, in a memory arranged in a control device and, depending on the result of this processing, the driver assistance system can electronically actuate an extremely wide range of components of the vehicle—for example with the aid of a microcontroller which is likewise arranged in the control device.

Up to now, if only one central control device is used by a plurality of vehicle cameras for implementing different driver assistance functions, multiple signal processors have accordingly been arranged in the central control device. In this case, each signal processor serves to process the video signals of one of the vehicle cameras.

SUMMARY OF THE INVENTION

The object substantially forming the basis of the present invention is to save costs and to reduce the size for control devices or respectively driver assistance systems, in which image data of a plurality of vehicle cameras are processed in order for different driver assistance functions to be implemented.

One significant idea of the invention is to configure a signal processor (DSP) in a control device (ECU) of a driver assistance system, in particular by means of a corresponding programming code or respectively control algorithm, such that said signal processor serves to process image data of a plurality of vehicle cameras and, in particular, selectively only processes the image data of one of the plurality of vehicle cameras.

The control device (ECU) according to the invention for a driver assistance system of a vehicle comprises a signal processor, in particular only one signal processor (DSP), which serves to process image data of a plurality of vehicle cameras, in particular of a first vehicle camera and of a second vehicle camera (K1, K2), wherein, as a function of a current operating state of the vehicle, the signal processor is configured such that the latter selectively processes the image data from one of the plurality of vehicle cameras, in particular either the image data of only the first vehicle camera (K1) or of only the second vehicle camera (K2).

Furthermore, the invention relates to a method for operating a driver assistance system of a vehicle, in which image data of a plurality of vehicle cameras are processed by means of a control device (ECU) of the driver assistance system, in particular image data of a first vehicle camera and of a second vehicle camera (K1, K2), wherein, as a function of a current operating state of the vehicle, only the image data from one of the plurality of vehicle cameras (K1, K2) are, in each case, processed by means of a signal processor of the control device (ECU).

According to a preferred configuration of the invention, a first camera of the plurality of vehicle cameras is a front camera (K1) and a second camera of the plurality of vehicle cameras is a reversing camera (K2). The operating state of the vehicle, as a function of which the signal processor either processes the image data of the front camera or reversing camera according to the invention, preferably concerns information regarding whether the vehicle is traveling forwards or reversing. The signal processor can obtain this information, by way of example, by means of a connection with the bus (BUS) of the vehicle as well as, by way of example, as a function of which gear is currently selected. If, in this example, the signal processor obtains the information that the vehicle is traveling forwards, the signal processor preferably exclusively processes the image data of the front camera (K1) and, in particular, only programming codes in order to implement driver assistance functions which are assigned to the front camera (K1). In the reverse case, i.e. if the signal processor (DSP) obtains the information that the vehicle is reversing, the signal processor preferably exclusively processes the image data of the reversing camera (K2) and, in particular, only programming codes in order to implement driver assistance functions which are assigned to the reversing camera (K2).

According to another preferred configuration of the invention, one of the plurality of vehicle cameras is a camera system of the vehicle which comprises a plurality of individual vehicle cameras. Such a camera system can be, by way of example, a so-called surround view camera system. Surround view camera systems are essentially known from the prior art. In the case of such systems, image data from different areas of the vehicle surroundings are detected by means of a plurality of—as a general rule at least four—cameras arranged on the vehicle and are combined to produce an overall image, in particular to produce a so-called panoramic view, or top view or bird's eye view of the vehicle surroundings. This overall image can be displayed in a helpful manner to the vehicle operator on a screen, by way of example, during maneuvering. In the case of this configuration, as a function of the current operating state of the vehicle, the signal processor either processes only the image data and, in particular, only programming codes in order to implement driver assistance functions which are assigned to the camera system, by way of example to a surround view camera system, as well as, by way of example, when reversing or traveling forward slowly (e.g. below 40, 50 or 60 km/h), or only processes the image data and programming codes of another vehicle camera or respectively of another camera system.

Furthermore, the invention relates to a driver assistance system which comprises a control device (ECU) according to the invention and/or is operated in accordance with the method according to the invention.

BRIEF DESCRIPTION OF THE DRAWING

The invention will be explained in greater detail below with reference to the embodiment example which is represented by a schematic diagram in FIG. 1.

DETAILED DESCRIPTION OF EXAMPLE EMBODIMENTS OF THE INVENTION

According to the embodiment example in FIG. 1, the control device (ECU) according to the invention comprises a signal processor (DSP). The signal processor (DSP) is preferably a digital signal processor (DSP) which can be used, in the case of analog image data, by way of example, in combination with analog-to-digital converters. The control device (ECU) can also comprise further components, in particular storage devices, in which the programming codes executed by the signal processor (DSP) for the respective driver assistance functions are stored, as well as a microcontroller and further components required for the implementation of the driver assistance functions.

According to the embodiment example from FIG. 1, the signal processor (DSP) receives image data from two cameras (K1, K2). To this end, the control device (ECU) is preferably configured with at least two inputs for the video signals of the cameras (K1, K2), by way of example two LVDS video inputs. In particular, if one of the cameras (K1, K2) is a camera system which comprises a plurality of individual cameras, the control device (ECU) can be configured with a corresponding plurality of video inputs, wherein if one of operating states assigned to the camera system exists, only the image data of the cameras which are assigned to the camera system are processed.

In the present embodiment example, the signal processor (DSP) furthermore receives information regarding the current operating state of the vehicle by means of the bus (BUS) of the vehicle, for example by means of a CAN bus, a LINK bus and/or a Flexray bus of the vehicle.

The invention claimed is:

1. A control device for a driver assistance system of a vehicle,
comprising a signal processor configured and disposed to process image data from a plurality of vehicle cameras including a first vehicle camera and a second vehicle camera,
wherein the first vehicle camera or the second vehicle camera is a surround view camera system, and
wherein the signal processor is particularly configured and disposed to receive operating state data indicative of a current operating state of the vehicle, to process selectively either only the image data from the first vehicle camera or only the image data from the second vehicle camera at a given time dependent on and in response to the current operating state of the vehicle, and to process only the image data from the surround view camera system only when the current operating state of the vehicle comprises reverse or forward motion of the vehicle at a slow non-zero speed below a speed threshold.

2. A driver assistance system of a vehicle, comprising:
a first camera system configured and disposed to produce first image data, and a second camera system configured and disposed to produce second image data; and
a control device comprising a signal processor that is connected to the first and second camera systems and is configured and disposed to receive the first image data from the first camera system and the second image data from the second camera system;
wherein one of the camera systems is a surround view camera system,
wherein the signal processor is configured and disposed to receive current operating state data indicative of a current operating state of the vehicle,
wherein the signal processor is configured and disposed to process selectively either only the first image data or only the second image data at a given time dependent on and in response to the current operating state of the vehicle, and
wherein the signal processor is configured and disposed to process only the image data from the surround view camera system when the current operating state of the vehicle comprises reverse or forward motion of the vehicle at a slow non-zero speed below a speed threshold.

3. The driver assistance system according to claim 2, wherein at least one of the first and second camera systems respectively comprises plural cameras.

4. The driver assistance system according to claim 2, comprising a plurality of camera systems including the first camera system and the second camera system, and wherein the signal processor is the single and only signal processor of the control device configured and disposed to receive and process the image data from any of the plurality of camera systems.

5. The driver assistance system according to claim 2, wherein the speed threshold is in a range from 40 km/h to 60 km/h.

6. The driver assistance system according to claim 2,
further comprising at least one storage device in which are stored a first set of programming codes for implementing a first driver assistance function assigned to the first camera system and a second set of programming codes for implementing a second driver assistance function assigned to the second camera system,
wherein the signal processor is connected to the at least one storage device, and is configured and disposed to additionally process, at the given time, selectively either only the first set of programming codes in connection with the first image data to implement the first driver assistance function or only the second set of programming codes in connection with the second image data to implement the second driver assistance function.

7. The driver assistance system according to claim 2,
wherein the signal processor is configured and disposed to produce, at the given time, selectively either only first processing results from processing the first image data or only second processing results from processing the second image data, and
further comprising a microcontroller configured and disposed to actuate at least one component of the vehicle in response to and dependent on the first processing results or the second processing results at the given time.

8. The driver assistance system according to claim 2,
further comprising a display screen configured and disposed to display the first image data and/or the second image data, and
wherein the signal processor is configured and disposed to process, at the given time, either only the first image data or only the second image data which is different from the image data being displayed on the display screen.

9. The control device according to claim 1, wherein the speed threshold is in a range from 40 km/h to 60 km/h.

10. The control device according to claim 1, wherein each one of the first vehicle camera and the second vehicle camera respectively includes only a respective single imaging device.

11. The control device according to claim 1, wherein the vehicle has a plurality of vehicle cameras including the first vehicle camera and the second vehicle camera, and wherein the signal processor is the single and only signal processor of the control device configured and disposed to receive and process the image data from any of the plurality of vehicle cameras.

12. The control device according to claim 1,
further comprising at least one storage device in which are stored a first set of programming codes for implementing a first driver assistance function assigned to the first vehicle camera and a second set of programming codes for implementing a second driver assistance function assigned to the second vehicle camera,
wherein the signal processor is connected to the at least one storage device, and is configured and disposed to additionally process, at the given time, selectively either only the first set of programming codes in connection with the image data from the first vehicle camera to implement the first driver assistance function or only the second set of programming codes in connection with the image data from the second vehicle camera to implement the second driver assistance function.

13. The control device according to claim 1,
wherein the signal processor is configured and disposed to produce, at the given time, selectively either only first processing results from processing the image data from the first vehicle camera or only second processing results from processing the image data from the second vehicle camera, and
further comprising a microcontroller configured and disposed to actuate at least one component of the vehicle in response to and dependent on the first processing results or the second processing results at the given time.

14. The control device according to claim 1,
further comprising a display screen configured and disposed to display the image data from the first vehicle camera and/or the image data from the second vehicle camera, and
wherein the signal processor is configured and disposed to process, at the given time, either only the image data from the first vehicle camera or only the image data from the second vehicle camera, which is different from the image data being displayed on the display screen.

15. A method of operating a driver assistance system of a vehicle, comprising the steps:
a) with a first camera system of the driver assistance system, producing first image data;
b) with a second camera system of the driver assistance system, producing second image data;
c) with a signal processor of the driver assistance system, receiving the first image data and the second image data;
d) with the signal processor, receiving current operating state data indicative of a current operating state of the vehicle, being a first operating state at a first time and a second operating state at a second time, wherein the first operating state comprises reverse or forward motion of the vehicle at a slow non-zero speed below a speed threshold, and the second operating state is other than reverse or forward motion of the vehicle below the speed threshold;
e) with the signal processor, at the first time, dependent on and in response to the first operating state processing selectively only the first image data and not the second image data; and
f) with the signal processor, at the second time, dependent on and in response to the second operating state processing selectively only the second image data and not the first image data.

16. The method according to claim 15, wherein the first camera system comprises a surround view camera system.

17. The method according to claim 15, wherein one of the first and second camera systems includes only a single camera.

18. The method according to claim 15, wherein the speed threshold is in a range from 40 km/h to 60 km/h.

19. The method according to claim 15, wherein both of the first and second camera systems each respectively include only a respective single camera.

20. The method according to claim 16, wherein the second camera system includes only a single camera.

* * * * *